Patented May 2, 1933

1,906,938

UNITED STATES PATENT OFFICE

WILLIAM P. TER HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Original application filed December 4, 1929, Serial No. 411,666. Divided and this application filed July 28, 1931. Serial No. 553,642.

This invention relates to the treatment of rubber and similar materials, more particularly to a treatment of the same with the rearranged reaction products of ketones and amino compounds, or certain derivatives of the foregoing. It also relates to the products of such treatment.

An object of this invention is to provide materials having the property of retarding the deterioration of rubber. A still further object is to provide materials having vulcanization-accelerating properties. Other objects will be apparent from the herein set forth description.

Accordingly the invention comprises treating rubber or similar materials with a rearranged reaction product of a ketone and an aromatic amino compound. Such materials are stable, and will when used in rubber exhibit at least one of the above mentioned properties.

Examples of rearranged reaction products of ketones—acetone-diphenyl guanidine rearranged in the presence of aniline hydrochloride, acetone-alpha-naphthyl amine rearranged in the presence of aniline hydrochloride.

Instead of the ketones mentioned above the following may be used: phorone, diethyl ketone, benzo phenone, aceto-phenone, dichloracetone, aldol acetone, allyl-acetone, benzal acetone, diacetyl, acetyl-acetone, acetonyl-acetone, salicyl aldehyde-acetone, furfural-acetone, mesityl oxide, diacetone alcohol.

Instead of the aromatic amino compounds mentioned above there may be used: monochloro aniline, ortho-toluidine, meta toluidine, para-toluidine, xylidines, alpha-naphthylamine, beta naphthylamine, amino diphenyl, dinaphthylamines, asymmetric diphenyl hydrazine, diamino diphenyl sulphide, diamino diphenyl polysulphides, diamino dinaphthyl sulfides, p-amino benzyl aniline, dinaphthyl diamino ethane, ditolyl diamino ethane, p-amino-p'naphthylamino diphenyl methane, p-p'-diamino diphenyl dimethyl methane, p-p'-dinaphthyl amino diphenyl dimethyl methane, phenyl beta naphthyl guanidine, phenyl-o-tolyl guanidine, di-o-tolyl biguanide, monophenyl biguanide, diphenyl biguanide, diphenyl acetamidine, o-phenylene diamine, m-phenylene diamine, p-phenylene diamine, dimethyl p-phenylene diamine, m-toluylene diamine, benzidine, naphthylene diamine; 2,2'-diamino diphenyl; 2,4'-diamino diphenyl; diphenyl-p-phenlyene diamine, ditolyl-p-phenylene diamine, dinaphthyl-p-phenylene diamine, diphenyl-benzidine, dinaphthyl-benzidine, naphthyl-m-toluylene, diamine, dinaphthyl-m-toluylene diamine; 2,4-diamino-diphenylamine; 4,4'-diamino diphenylamine; or mixtures of any of the foregoing aromatic amino compounds with a phenol such as phenol, alpha-naphthol, beta-naphthol.

In the reactions of ketones with salts of aromatic amino compounds, such aromatic amino compounds as contain at least one ortho or para carbon atom linked to hydrogen, have been found to be most suitable.

*Example 1*—Rearranged reaction products of ketones and amino compounds. 105 parts of acetone-aniline reaction product, prepared by reacting under heat and pressure aniline and acetone in the presence of a dehydrating agent such as iodine as described in by copending application Serial No. 411,665, filed December 4, 1929 were mixed with 100 grams of aniline and 20 cc. of concentrated acqueous hydrochloric acid. The mixture was kept at a temperature of 90° C. during 30 hours. At the end of 30 hours the hydrochloric acid was neutralized with caustic soda and unreacted aniline was removed by vacuum distillation. The residue weighed 120 grams and became brittle on cooling. It can be ground to a light brown powder. The product was tested by incorporating 1.5 parts in a tire tread compound containing 100 parts of rubber, 50 parts carbon black and a mixture of 1 part of hexamethylene tetramine and .25 parts of diphenyl guanidine, and vulcanizing and ageing. The tensile strengths before and after ageing are shown below.

| Green tensiles | Blank | + reaction product |
|---|---|---|
| (Cure) 60' at 45#.......... | 4260 | 4230 |
| (Cure) 75' at 45#.......... | 4415 | 4265 |
| (Cure) 90' at 45#.......... | 4215 | 4275 |
| Aged 168 hrs. in oxygen | | |
| (Cure) 60' at 45#.......... | 1310 | 3440 |
| (Cure) 75' at 45#.......... | 1250 | 3250 |
| (Cure) 90' at 45#.......... | 1180 | 3115 |

The accelerating properties of the reaction product is shown by incorporating 1.5 parts of the reaction product in a tire tread compound similar to that above but from which the usual accelerator was omitted.

| | Cure | Tensiles |
|---|---|---|
| Blank.................... | 90' at 45# | 1830 |
| + reaction product........ | 90' at 45# | 3595 |

The accelerating properties are also shown by incorporating 1 part of the reaction product in a rubber mix consisting of 100 parts of rubber, 10 parts of zinc oxide, and 3 parts of sulphur.

| | Cure | Tensiles |
|---|---|---|
| Blank—no accelerator...... | 60' at 40# | 402 |
| + reaction product........ | 60' at 40# | 2245 |

The simplest acetone aniline reaction product, on rearranging in the presence of aniline hydrochloride, would yield a product of the probable formula

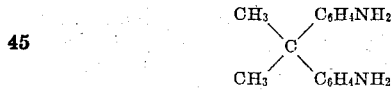

which can be called p, p'-diamino-di-phenyl-di-methyl methane. The reaction product of one mole of mesityl oxide and one mole of aniline on rearranging would yield a compound of the probable formula:

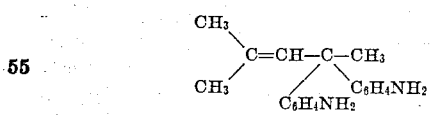

And finally, a phorone-aniline reaction product upon rearranging would yield a product of the probable formula

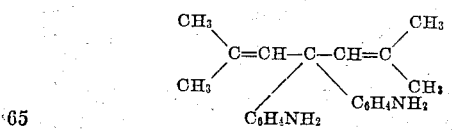

It is obvious that the above and similar products correspond to the probable general formula

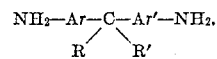

wherein $Ar$ and $Ar'$ are arylene groups, and $R$ and $R'$ are aliphatic hydrocarbon groups which may be saturated or unsaturated.

Rearranged ketone-amine reaction products may be made by rearranging in the presence of aromatic amine salts generally but differing in chemical nature depending on whether or not the amine of the amine salt used to rearrange, is the same or different from the amine originally used to prepare the ketone-amine reaction product. For example instead of using aniline hydrochloride as in the Example 1 above, the hydrochloride of naphthylamine or of diphenyl guanidine may be used. Also when the amine used in the preparation of the ketone-amine is different from the rearranging amines, rearranged ketone-amines of a mixed character result. For example the reaction product of acetone and alpha- or beta-naphthylamine may be rearranged in the presence of aniline hydrochloride, and the reaction product of acetone and 4,4'-diamino-diphenyl amine may be rearranged in the presence of toluidine hydrochloride.

It is to be understood that a mixture of the reaction products or derivatives may be used in rubber instead of a single reaction product or derivative. Also that a mixture of ketones, or a single ketone may be reacted with a single amino compound or with a mixture of amino compounds, such as described herein, to give products that may be used in rubber in the same manner.

The chemicals disclosed may be used to improve the properties as mentioned herein of inner tubes, tires, thread, hose, dipped goods, mechanical goods, latex or articles made from latex etc.

"Salt of an aromatic amino compound" and "amine salt" in the claims are to be understood as meaning the acid addition product of the amines or amino compounds, such as the hydrochloride, the sulfate, the phosphate, the acetate, etc. Also the term "rubber" is to be construed as including natural rubber, gutta percha, balata, synthetic rubber, or other rubber-like materials.

This case is a division of case Serial No. 411,666, filed Dec. 4, 1929.

With the detailed description given above, it will be obvious that modifications will suggest themselves without departing from the principle of the invention, for example in the preparation of any of the hereinmentioned compounds, the corresponding thioketone or the corresponding ketone dihalide may be used in place of a ketone, and it is not desired to limit the invention otherwise than as set forth in the appended claims.

Having thus described my invention, what I claim and desire to protect by Letters Patent is:

1. A method of treating rubber which comprises treating rubber with a reaction product of a ketone and an aromatic amine which product has been further reacted with a salt of a different aromatic amine.

2. A method of treating rubber which comprises treating rubber with a reaction product of an aliphatic ketone and an aromatic amine rearranged in the presence of a salt of a different aromatic amine.

3. A method of treating rubber which comprises treating rubber with a reaction product of a ketone and an aromatic amine rearranged in the presence of a salt of a different aromatic amine.

4. A method of treating rubber which comprises treating rubber with a reaction product of a ketone and a primary aromatic amine rearranged in the presence of a salt of a different primary aromatic amine.

5. A method of treating rubber which comprises treating rubber with a compound having the probable general formula $$NH_2-Ar-C-Ar'-NH_2,$$
$$\overset{\diagup\diagdown}{R\ \ R'}$$

wherein $Ar$ and $Ar'$ are different arylene groups, and $R$ and $R'$ are aliphatic hydrocarbon groups which may be saturated or unsaturated.

6. A method of treating rubber which comprises treating rubber with a reaction product of acetone and a naphthylamine rearranged in the presence of a salt of a primary aromatic amine other than said naphthylamine.

7. A method of treating rubber which comprises treating rubber with a reaction product of acetone and naphthylamine rearranged in the presence of aniline hydrochloride.

8. A method of treating rubber which comprises treating rubber with a reaction product of acetone and a salt of a toluidine rearranged in the presence of a primary aromatic amine other than said toluidine.

9. A method of treating rubber which comprises treating rubber with a reaction product of acetone and a toluidine rearranged in the presence of aniline hydrochloride.

10. A method of improving the properties of rubber which comprises vulcanizing rubber in the presence of a reaction product of an aliphatic ketone and an aromatic amine rearranged in the presence of a salt of a different aromatic amino compound.

11. A method of improving the properties of rubber which comprises vulcanizing rubber in the presence of a reaction product of a ketone and an aromatic amine rearranged in the presence of a salt of a different aromatic amine.

12. A method of improving the properties of rubber which comprises vulcanizing rubber in the presence of a reaction product of a ketone and a primary aromatic amine rearranged in the presence of a salt of a different primary aromatic amine.

13. A method of improving the properties of rubber which comprises vulcanizing rubber in the presence of a reaction product of acetone and a naphthylamine rearranged in the presence of a salt of a primary aromatic amine other than said naphthylamine.

14. A method of improving the properties of rubber which comprises vulcanizing rubber in the presence of a reaction product of acetone and naphthylamine rearranged in the presence of aniline hydrochloride.

15. A method of improving the properties of rubber which comprises vulcanizing rubber in the presence of a reaction product of acetone and a toluidine rearranged in the presence of a salt of a primary aromatic amine other than said toluidine.

16. A method of improving the properties of rubber which comprises vulcanizing rubber in the presence of a reaction product of acetone and a toluidine rearranged in the presence of aniline hydrochloride.

17. A rubber product which has been treated with a reaction product of a ketone and an aromatic amine rearranged in the presence of a salt of a different aromatic amine.

18. A rubber product which has been treated with a reaction product of a ketone and a primary aromatic amine rearranged in the presence of a salt of a different primary aromatic amine.

19. A vulcanized rubber product containing rubber which has been vulcanized in the presence of a reaction product of a ketone and an aromatic amine rearranged in the presence of a salt of a different aromatic amine.

20. A vulcanized rubber product containing rubber which has been vulcanized in the presence of a reaction product of a ketone and a primary aromatic amine rearranged in the presence of a salt of a different primary aromatic amine.

Signed at Montclair, county of Essex, State of New Jersey, this 24th day of July 1931.

WILLIAM P. TER HORST.